United States Patent

Adams

[11] Patent Number: 4,571,798
[45] Date of Patent: Feb. 25, 1986

[54] URETHANE COVERED PAPER MACHINE ROLL

[75] Inventor: Richard J. Adams, Rockton, Ill.

[73] Assignee: Beloit Corporation, Beloit, Wis.

[21] Appl. No.: 533,310

[22] Filed: Sep. 19, 1983

[51] Int. Cl.⁴ .................................... B30B 11/18
[52] U.S. Cl. .................................... 29/121.8; 29/132; 427/425; 100/176; 162/358
[58] Field of Search ............ 29/130, 132, 110, 121.8; 156/78, 79; 427/425; 100/155 R, 176; 162/358

[56] References Cited

U.S. PATENT DOCUMENTS

| | | | |
|---|---|---|---|
| 1,787,890 | 1/1931 | Woodward | 29/121.8 X |
| 2,114,072 | 4/1938 | Cleveland | 29/121.8 |
| 3,009,209 | 11/1961 | Weinbrenner et al. | 427/425 X |
| 3,087,231 | 4/1963 | Martin et al. | 100/155 R X |
| 4,060,439 | 11/1977 | Rosemund et al. | 156/78 |
| 4,187,356 | 2/1980 | Wagner | 427/425 X |
| 4,224,372 | 9/1980 | Romanski | 156/78 X |
| 4,229,253 | 10/1980 | Cronin | 162/358 |
| 4,229,254 | 10/1980 | Gill | 162/358 |
| 4,238,287 | 12/1980 | Gill | 162/358 |
| 4,267,299 | 5/1981 | Oechsle | 528/48 |
| 4,300,982 | 11/1981 | Romanski | 162/358 |
| 4,426,757 | 1/1984 | Hourticolon et al. | 29/121.8 |

Primary Examiner—Howard N. Goldberg
Assistant Examiner—John T. Burtch
Attorney, Agent, or Firm—Hill, Van Santen, Steadman & Simpson

[57] ABSTRACT

A urethane covered metal press roll is provided by spray coating the roll body with a quick jelling resin formulation creating isolated small pores giving the cover a stone-like texture. The coating is applied to a desired depth by successive passes of a spray jet over the rotating roll body. The resin quickly jells and after being cured, the cover is ground to a desired diameter and finish.

5 Claims, 6 Drawing Figures

URETHANE COVERED PAPER MACHINE ROLL

BACKGROUND OF THE INVENTION

1. Field of the Invention

This invention relates to rolls covered with elastomeric material for many uses in paper making machinery, and particularly deals with metal rolls spray coated with a polyurethane elastomer to any desired thickness and hardness without the need for molds or ovens and having a stone-like microstructure provided by closed isolated pores desirable for sheet release in paper making machinery such as press roll and calender stack assemblies.

2. Prior Art

Heretofore, elastomer covered paper machine rolls could only be produced with very expensive and extensive capital equipment, labor costs, and time delays. Such rolls had a short wear life, required bonding techniques for the interface between the cover and the metal roll, and the use of curing ovens, build up stations and casting molds.

It would then be an improvement in this art to produce elastomer covered, paper machine metal rolls without heretofore required extensive capital equipment and labor costs and with a longer wear life than heretofore achieved. It would especially be an improvement in the art to provide polyurethane covered paper machine press rolls having a stone-like texture provided by closed pores or bubbles facilitating paper release and resisting crushing in high pressure nips.

SUMMARY OF THE INVENTION

This invention now provides polyurethane covered metal rolls for supporting and conveying paper through high pressure nips of paper making machine assemblies such as press rolls, calender stacks, and the like. The elastomer cover can have any desired thickness and hardness and contains a myriad of closed isolated bubbles or pores, but is not porous. The cover is formed by spray coating, directly onto a metal roll, a solventless two component urethane resin formulation composed of a isocyanate terminated prepolymer cured with a polyol and a catalyst. The resin components are mixed immediately prior to being fed to a spray gun and are maintained under pressure to feed the gun. The formulation quickly jells on the rolls so that no molds or curing ovens are needed.

In a preferred arrangement, a steel roll has its journals mounted in bearings, and is rotated at a selected rate. A spray gun deposits the resin on the rotating roll being reciprocated along the length of the roll at a selected rate. The speed of rotation of the roll and the rate of longitudinal advancement of spray gun are correlated to provide a coat of the desired depth. Successive coatings are applied to build up a cover of the desired thickness with the underlying coat quickly jelling to accept another layer of the resin.

The cover may vary greatly in thickness depending upon its anticipated use conditions. Thicknesses of 0.1 to 2 inches are useful. For example, if it is desired to build up a coating ½ inch thick, the spray pattern can be adjusted to a 20 degree width, the longitudinal traverse of the spray head would be set at a 2 inch lead and this would result in a thickness of 0.05 inches per layer with a 10 layer application producing the ½ inch thickness. This procedure results in a coating which is completely homogeneous throughout its thickness since the successive layers are applied before the underlying layer has set. Setting or full curing of the coating takes about two to seven days. After curing, the coating is ground to a desired diameter and finish.

The coating has myriad of completely closed or isolated voids or pores, preferably within the range of 0.019 to 0.185 millimeters in diameter with the majority being in the range of 0.037 to 0.074 millimeters.

Shore hardnesses of from 60 on the A scale to 70 on the D scale are available by controlling the resin formulation. Pressure of about 100 pounds per square inch are maintained on the resin formulation fed to the spray gun.

Suitable urethane resin formulations and mixing conditions are disclosed in Oechsle U.S. Pat. No. 4,267,299.

It is then an object of this invention to provide paper making machinery metal rolls spray coated with an elastomer having closed isolated pores providing a stone-like microstructure facilitating release of the paper.

A further object of this invention is to provide urethane covered metal press rolls for paper making machinery.

A still further object of this invention is to provide metal rolls for use in pressure nips of paper making machinery and the like having urethane covers spray coated thereon and containing a myriad of closed isolated pores providing a stone-like microstructure and ground to a desired diameter and finish.

A further object of this invention is to provide a method of spray coating elastomer covers on paper machine rolls.

A still further object of this invention is to provide a method of spray coating polyurethane on metal rolls to form covers of desired thickness which have a liquid impervious microstructure containing a myriad of closed pores.

Other and further objects of this invention will become apparent to those skilled in this art from the following detailed description of the annexed sheet of drawings which, by way of a preferred example, illustrates a best mode embodiment of this invention.

BRIEF DESCRIPTION OF THE PREFERRED EMBODIMENT

Figure 1:
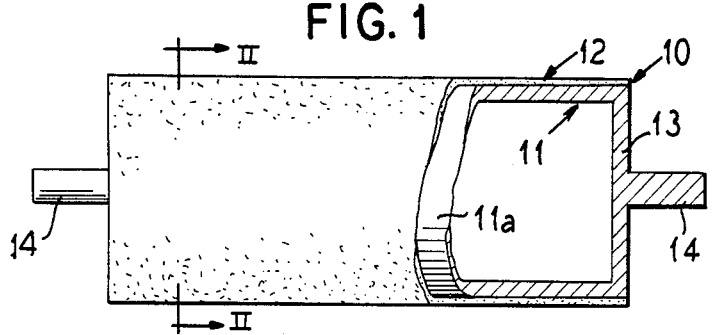
FIG. 1 is a side elevational view of an elastomer covered metal roll of this invention with parts broken away.
Figure 2:
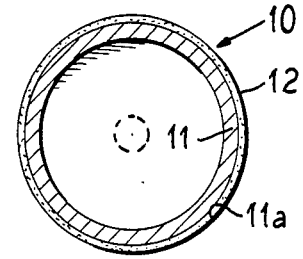
FIG. 2 is a transverse cross-sectional view along the line II—II of FIG. 1.

The roll 10 as illustrated in FIGS. 1 and 2 has a conventional cylindrical steel body 11 of any desired diameter and length for use in pressure nip assemblies of paper making machinery. The cylindrical surface 11 of the steel roll is covered with an elastomer 12 which, according to this invention, is spray coated on the roll from a quick jelling elastomer formulation. The steel roll 11, as illustrated in FIG. 1, has conventional end heads 13 and axles or journals 14 projecting from the ends. The coat or cover 12 is directly bonded to the roll 11 without an interposed adhesive substrate layer.

The preferred elastomer coat is a polyurethane which has excellent crush resisting properties, and yet is somewhat resilient even though it is cured to a hard finish. The urethane resin formulation is composed of an isocyanate terminated prepolymer and a catalyst. The formulation is free from solvents and is mixed immediately prior to use to a constituency that will flow through a spray gun, adhere to the roll surface, and quickly jell. The above referred to Oeshsle U.S. Pat. No. 4,267,299 discloses a suitable two component solventless urethane resin formulation for the spray coating of the rolls.

Figure 3:
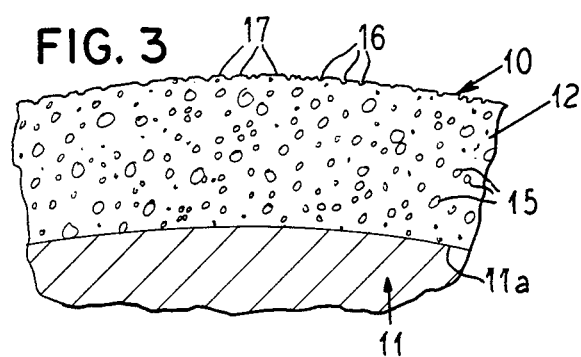
FIG. 3 is a greatly magnified portion of the roll cross-section of FIG. 2.
Figure 4:
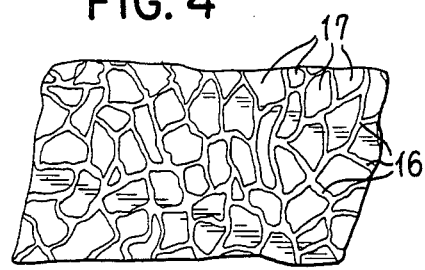
FIG. 4 is a greatly magnified plan view of a portion of the roll surface attempting to illustrate the stone-like texture.

As illustrated in FIG. 3, the urethane cover 12 contains a myriad of isolated small diameter pores or bubbles 15 of sizes referred to hereinabove producing an impervious microstructure with a stone-like texture. The cover 12 is ground to a desired surface finish and diameter providing the surface illustrated in FIG. 4 as having seams 16 between smooth areas 17. The seams may be defined by the walls of the pores 15, but do not open up paths which would make the cover porous. The seams and interspersed polished solid areas cooperate to provide excellent paper release properties.

Figure 5:
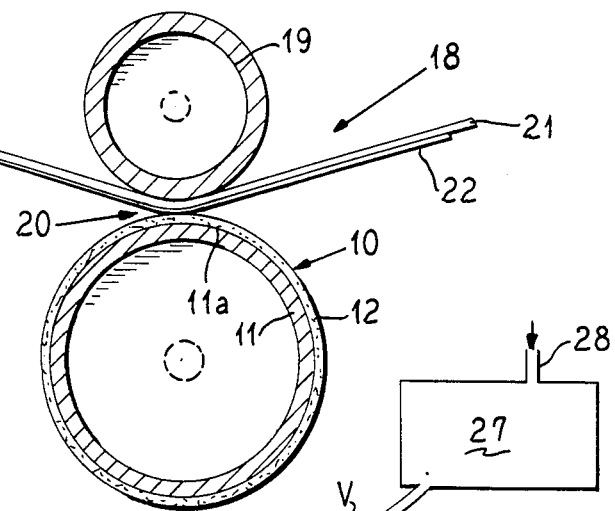
FIG. 5 is a diagrammatic view of a paper machine press roll assembly having an elastomer covered roll of this invention.

As shown in FIG. 5, a urethane covered roll 10 of this invention provides the bottom press roll of a paper machine press roll assembly 18 having a steel top roll 19, cooperating with roll 10 to define a pressure nip 20. A paper machine felt 21 conveys a paper web 22 through the nip 20 with the paper engaging the surface of the urethane cover 12 as it passes through the nip and as explained above, the texture of this cover 12 easily releases the paper after passage through the nip. The cover is sufficiently hard to resist high nip loads.

Figure 6:
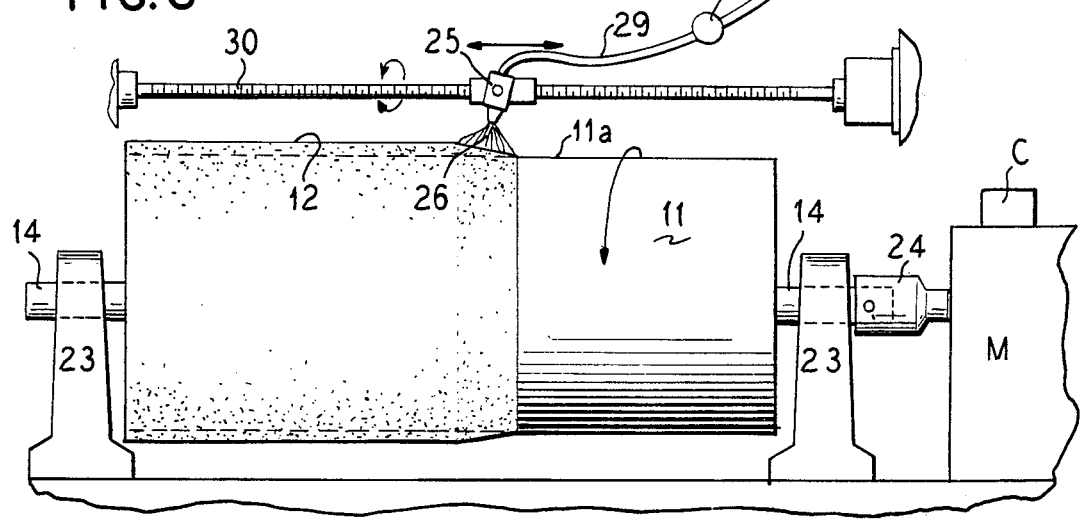
FIG. 6 is a somewhat diagrammatic view illustrating a method of forming the roll of this invention.

As shown in FIG. 6, the roll 10 is inexpensively and easily formed by mounting the axles 14 of the steel roll 11 in fixed bearing stands 23 of a lathe or the like with one of the axles engaged by a rotating device 24 driven, for example, by a variable speed motor M. The cylindrical portion of the roll body 11 extends horizontally between the bearing stands 23 in the path of a spray gun 25 discharging a jet 26 against the cylindrical surface 11a of the roll. The spray gun is supplied from a pressurized container 27 in which the components of the resin formulation are mixed. The container 27 is pressurized as indicated at 28 to pressures of about 100 pounds per square inch, and a flexible high pressure hose 29 connects the container to the spray gun 25. A valve V can control the flow rate to the gun and a speed control C can regulate the speed of the motor M.

The spray gun 25 is traversed along the length of the roll 11 by a suitable feed device such as a screw rod 30. The jet 26 builds up a urethane coating of selected thickness during a plurality of passes along the length of the roll 11. The initial deposit is directly on the metal surface of the roll 11 with the subsequent coats being applied over the previous coats which quickly jell.

The cover 12 when reaching the desired depth or thickness, is then allowed to cure and when completely set, the surface of the cover is ground to a desired diameter and finish. The finished roll then has the desired diameter, contour, and surface finish. If desired, the grinding or milling of the cover can provide a crown on the roll or any other contour including air or water release grooves.

From the above descriptions, it will be clear that this invention now provides spray deposited elastomer covered metal rolls with microstructure highly desired in press roll assemblies of paper making machinery.

While in the specific embodiment illustrated, the urethane was sprayed directly on the metal roll without adhesive, it will be appreciated that, depending on the specific application, it may be useful to apply an adhesive to the roll body or even an intermediate transition layer such as a fiber reinforced material.

I claim as my invention:

1. A press roll which comprises a metal roll body and a spray deposited impervious elastomer cover around and secured to said body having a micro structure containing small isolated closed pores throughout the thickness thereof and a finished stone-like peripheral surface with uncovered pores isolating a myriad of smooth areas surrounded by seams defined by the walls of the uncovered pores, and said pores beneath said peripheral surface remaining isolated and closed to maintain the imperviousness of the cover.

2. The roll of claim 1 wherein the cover has a thickness of about 0.1 to 2 inches and the pores have a diameter of about 0.019 to 0.185 inches.

3. The roll of claim 1 wherein the cover has a shore hardness of 60 on the A scale to 70 on the D scale.

4. A press roll for papermaking machinery which comprises a metal roll body covered with an integral layer of spray deposited impervious polyurethane resin containing small isolated pores throughout the thickness of the layer and having a ground stone-like paper web receiving peripheral surface with uncovered pores isolating small smooth areas surrounded by seams defined by the walls of the uncovered pores and facilitating release of paper from said peripheral surface.

5. A paper machine press roll comprising a steel roll body with a cylindrical surface, a spray deposited two-component solvent-free urethane resin impervious cylindrical cover surrounding said surface in bonded relation therewith and having a thickness of about 0.1 to 2 inches, said cover having a myriad of small isolated closed pores distributed throughout the thickness thereof, said pores having a diameter of about 0.019 to 0.185 millimeters, and a ground finished web-receiving peripheral surface on said cover having uncovered pores isolating a myriad of smooth areas surrounded by seams defined by the walls of the uncovered pores and facilitating release of paper from said peripheral surface, the pores beneath said peripheral surface remaining isolated and closed to maintain the imperviousness of the cover, and said cover having a shore hardness from about 60 on the A scale to 70 on the D scale.

* * * * *